United States Patent [19]
Naito et al.

[11] Patent Number: 4,773,500
[45] Date of Patent: Sep. 27, 1988

[54] DRIVING TORQUE DISTRIBUTION CONTROL SYSTEM FOR 4WD VEHICLE

[75] Inventors: Genpei Naito, Yokosuka; Shuuji Torii, Yokohama; Kiyotaka Ozaki, Yokosuka, all of Japan

[73] Assignee: Nissan Motor Co., Ltd., Yokohama, Japan

[21] Appl. No.: 906,309

[22] Filed: Sep. 12, 1986

[30] Foreign Application Priority Data

Sep. 13, 1985 [JP] Japan .............................. 60-202896
Sep. 20, 1985 [JP] Japan .............................. 60-208477

[51] Int. Cl.$^4$ ............................................ B60K 17/34
[52] U.S. Cl. ........................................................ 180/233
[58] Field of Search ............... 180/233, 234, 247, 248, 180/249, 197, 70.1; 74/856, 865

[56] References Cited

U.S. PATENT DOCUMENTS 4,444,286  4/1984  Hawkins ............................. 180/197
4,466,502  8/1984  Sakai .................................. 180/248
4,484,654 11/1984  Hayakawa ......................... 180/248

FOREIGN PATENT DOCUMENTS

43237  1/1982  European Pat. Off. .
3145279  5/1983  Fed. Rep. of Germany ...... 180/233
3427725  8/1985  Fed. Rep. of Germany .
58-26636  2/1983  Japan .

Primary Examiner—John J. Love
Assistant Examiner—Everett G. Diederiks, Jr.
Attorney, Agent, or Firm—Foley & Lardner, Schwartz, Jeffery, Schwaab, Mack, Blumenthal & Evans

[57] ABSTRACT

A four wheel drive system has an interaxle multiple disc friction clutch, an actuator for varying torque transmitted through the clutch to a front wheel drive shaft by varying a clutch pressure of the clutch, first and second sensors for sensing rotational speeds of the front wheel and rear wheel drive shafts, a third element for producing a third signal, and a control unit for controlling a driving torque distribution between the front and rear wheel drive shafts by sending a control signal to the actuator. The control means increases the torque transmitted through the clutch with increase in a speed difference between the front wheel and rear wheel drive shafts in accordance with one of characteristics selected in accordance with the third signal. The third element is designed to find a condition of the vehicle which can be controlled by a driver of the vehicle, and may take the form of an accelerator position sensor or a manually operated selector switch.

24 Claims, 10 Drawing Sheets

DRIVING TORQUE DISTRIBUTION CONTROL SYSTEM FOR 4WD VEHICLE

BACKGROUND OF THE INVENTION

The present invention relates to a four wheel drive system which controls the distribution of a driving torque (or force) between front wheels and rear wheels.

One conventional example of a four wheel drive system is disclosed in Japanese patent provisional publication No. 58-26636. In this conventional system, driving torque is transmitted directly to one of front wheel drive shaft and rear wheel drive shaft, and driving torque is transmitted through a hydraulic type transfer clutch to the other of the front wheel and rear wheel drive shafts. The transfer cluch is normally held in a slippingly engaged state to drive the vehicle in a near two wheel drive mode in which the torque is transmitted through the transfer clutch only slightly. When a slip occures betweeen the front and rear wheels, the transfer clutch is brought into a fully engaged state to provide a complete four wheel drive mode. Thus, this control system is switched between the two wheel drive mode and the four wheel drive mode in a manner of the one-off control. Accordingly, the cornering characteristic of the vehicle shows a strong understeer tendency in the four wheel drive mode. In the case of the two wheel drive mode, this system is liable to cause a wheel slip duing a rapid start of the vehicle, and a spin during a turn of the vehicle.

Japanese patent applications Nos. 59-276048, 59-276049 and 60-35923 disclose four wheel drive systems designed to control the clutch engagement force of the transfer clutch in accordance with a speed difference between the front wheels and the rear wheels, and to vary a control characteristic in accordance with a condition such as a coefficient of friction of a road surface or a vehicle speed. However, these systems are arranged to determine a factor of proportionality of the control characteristic, independently of an accelerating condition of the vehicle. Therefore, these systems are liable to cause a wheel slip during a rapid start, and a spin during a turn with a rapid acceleration when the factor of proportionality is set equal to such a small value as to provide a driving torque distribution near to the two wheel drive mode. When the factor of proportionality is set equal to such a great value as to provide a driving torque distribution near to the four wheel drive mode, these systems are liable to increase the understeer tendency too much during a turn with a gradual acceleration.

SUMMARY OF THE INVENTION

It is an object of the present invention to provide four wheel drive systems for controlling the driving torque distribution smoothly in accordance with a speed difference between the front and rear wheels by using one of control characteristics which is selected in accordance with an accelerating condition of the vehicle or a driver's command.

Figure 1:
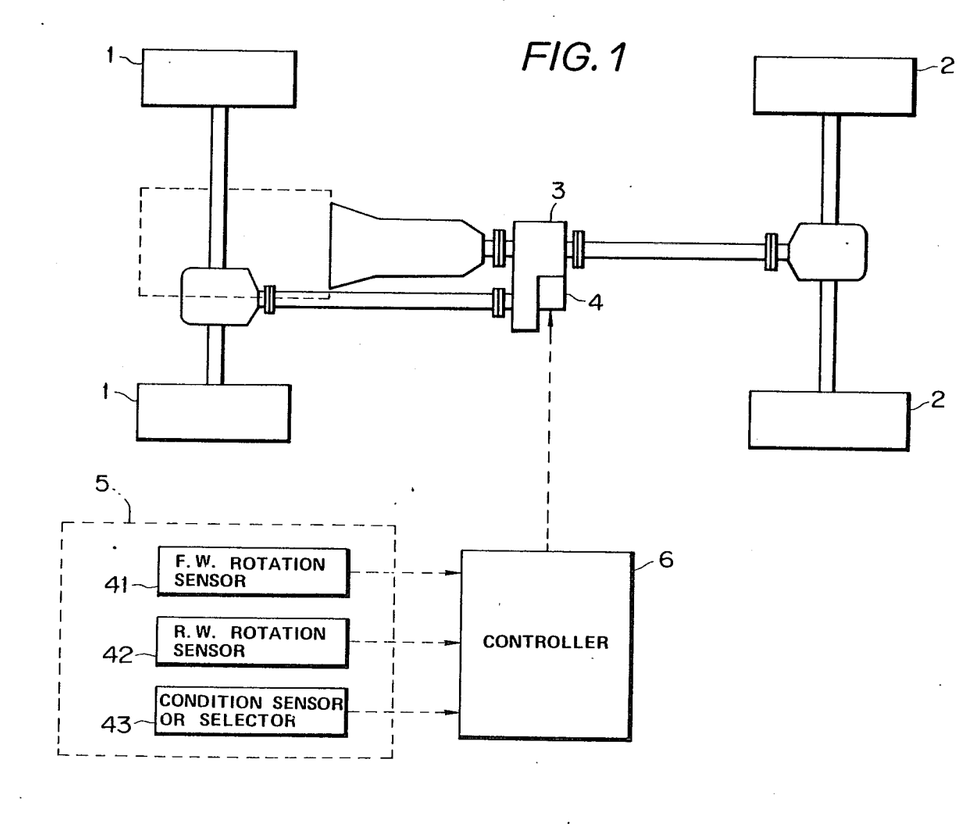
FIG. 1 is a schematic view showing a four wheel drive system of the present invention as an example.

According to the present invention, a four wheel drive system (One example is shown in FIG. 1 to facilitate understanding of the invention.) for a vehicle having at least an engine, a primary driving wheel pair and a secondary driving wheel pair, comprises a transfer mechanism (3), an actuating means(4), a first means (41), a second means (42), a third means (43), and a control means (6). The transfer mechanism transmits torque from the engine to the primary wheel pair, and from the engine to the secondary wheel pair through a transfer clutch capable of varying torque transmitted therethrough in accordance with a variable clutch engagement force of the transfer clutch. The actuating means varies the clutch engagement force of the transfer clutch in response to a control signal. The first means senses a primary wheel rotational speed, and the second means senses a secondary wheel rotational speed. The third means produces a third signal indicative of a position of a movable control element controllable by a driver of the vehicle. The control means produces the control signal to vary the clutch engagement force of the transfer clutch. The control means increases the clutch engagement force with increase in a speed difference resulting from subtraction of the secondary wheel speed from the primary wheel speed in accordance with one of predetermined relationships selected in accordance with the third signal produced by the third means.

In one embodiment of the invention, the third means senses an accelerating condition such as a condition of an accelerator system of the vehicle, and the control means increases the clutch engagement force with increase in the speed difference at a rate of increase which is set equal to a higher value when the accelerating condition indicates a rapid acceleration, and equal to a lower value lower than the higher value when the accelerating condition indicates a gradual acceleration of the vehicle.

Each of the predetermined relationships may relates a desired torque to be transmitted to the secondary wheel pair through the transfer clutch, with the speed difference in such a manner that the desired torque is equal to a product obtained by multiplying the speed difference by a predetermined first coefficient when the speed difference is smaller than a reference value, and equal to a sum of a first product obtained by multiplying a difference between the speed difference and the reference value by a second coefficient which is greater than the first coefficient, and a second product obtained by multiplying the reference value by the first coefficient when the speed difference is greater than the reference value.

DETAILED DESCRIPTION OF THE INVENTION

To facilitate understanding the situation of the present invention, reference is made to the following copending patent applications in which at least one of the inventors of the present application is named as an inventor, and which disclose various driving force distribution control systems for 4WD vehicles; a U.S. application Ser. No. 797,927, filed by OZAKI et al. on Nov. 14, 1985; a U.S. application Ser. No. 830,015 filed by TORII et al. on Feb. 18, 1986; a U.S. application Ser. No. 820,055 filed by OZAKI et al. on Jan. 21, 1986; and a new U.S. application Ser. No. not yet assigned, filed by G. NAITO, on Aug. 5, 1986 for DRIVING FORCE DISTRIBUTION CONTROL SYSTEM FOR 4WD VEHICLE.

FIG. 1 shows one example of a four wheel drive system according to the present invention. The four wheel drive system has a transfer (or a transfer mechanism) 3 through which a driving torque is transmitted from an engine of the vehicle to front wheels 1 and rear wheels 2. The transfer 3 includes a transfer clutch capable of varying a torque transmitted therethrough. A driving torque distribution control system is constituted of the transfer 3, an actuator 4 for actuating the transfer clutch, a sensor group 5 and a controller 6 for producing a control signal in accordance with input signals produced by the sensor group 5, and controlling a clutch engagement force of the transfer clutch by sending the control signal to the actuator 4. The sensor group 5 comprises a front wheel rotation sensor 41 for determining a front wheel rotational speed of the front wheels 1 by sensing, for example, a rotational speed of a rotating shaft for driving the front wheels 1, a rear wheel rotation sensor 42 for determining a rear wheel rotational speed of the rear wheels 2 by sensing, for example, a rotational speed of a shaft for driving the rear wheels 2, and a third element 43. The controller 6 determines a speed difference between the front wheel speed and the rear wheel speed from the signals sent from the sensors 41 and 42, and determines a torque to be transmitted through the transfer clutch, corresponding to the speed difference, by using a control characteristic (or a relationship) between the torque and the speed difference, which is selected from a set of such control characteristics (or relationships) in accordance with the signal sent from the third element 43.

A FIRST EMBODIMENT of the present invention is shown in FIGS. 2-6. In the first embodiment, the present invention is applied to a four wheel drive vehicle based on a rear wheel drive.

Figure 2:
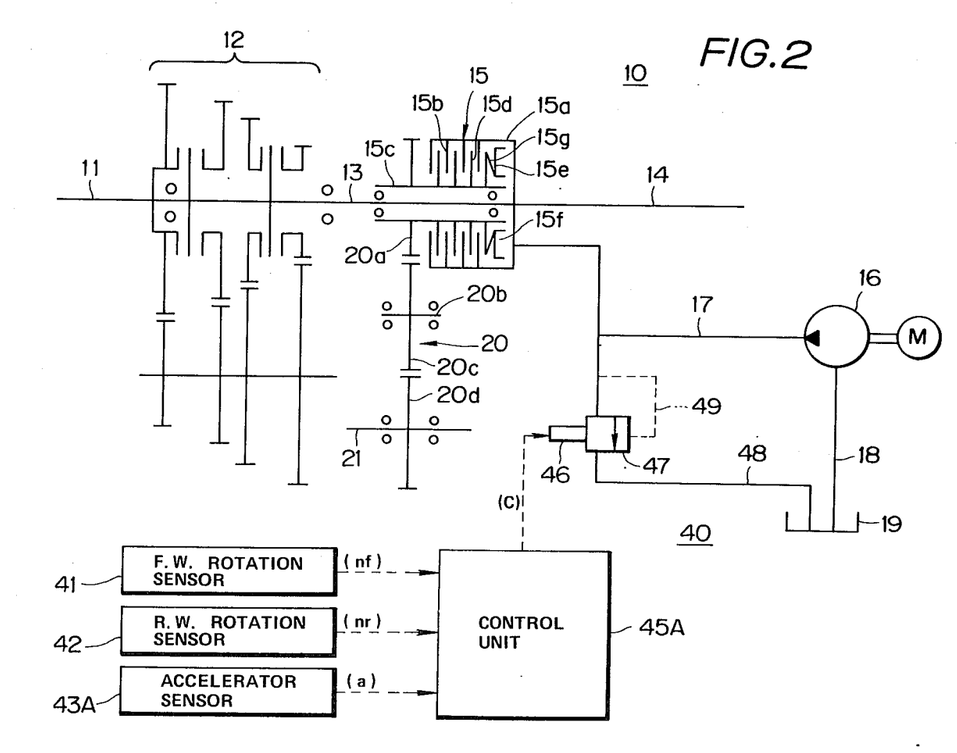
FIG. 2 is a schematic view showing a four wheel drive system according to a first embodiment of the present invention.

As shown in FIG. 2, a four wheel drive system of the first embodiment has a transmission 12, a transfer 10 for distributing the driving power of an engine between a front axle and a rear axle, a hydraulic circuit 40, a control unit 45A and a group of sensors 41, 42 and 43A.

The transmission 12 has an input shaft 11 to which torque is transmitted from the engine through a master clutch disposed between the engine and the transmission 12. The transmission 12 of this embodiment is a manual transmission of a parallel shaft gear type consisting of several sets of gears installed on two parallel shafts.

The transfer 10 has a transfer clutch (or an inter-axle clutch) 15 which can vary a front wheel driving torque transmitted to the front wheels 1 in accordance with a clutch engagement force. The transfer 10 has an input shaft 13 for transmitting the driving torque from the transmission 12 to the transfer clutch 15. A rear wheel drive shaft 14 is placed in alignment with the input shaft 13, and connected with the input shaft 13 so that the driving torque is transmitted directly from the input shaft 13 to the rear wheel drive shaft 14.

The transfer clutch 15 of this embodiment is a multiple disc friction clutch. The transfer clutch 15 has a clutch drum 15a fixed with the input shaft 13 and the rear wheel drive shaft 14, and a clutch hub 15c rotatably mounted on the input shaft 13. Between the clutch drum 15a and the clutch hub 15c, there are disposed a series of alternately arranged friction plates 15b and friction discs 15d. The friction plates 15b are connected with the clutch drum 15a so that the plates 15b rotate together with the clutch drum 15a. The friction discs 15d are connected with the clutch hub 15c so that the discs 15d rotate together with the hub 15c. The transfer clutch 15 further has a clutch piston 15e disposed between a bottom of the clutch drum 15a and one axial end of the series of plates 15b and discs 15d. A cylinder chamber 15f is formed between the piston 15e and the clutch drum 15a.

The transfer 10 further has a gear train 20, which includes a first gear 20a formed on the outer periphery of the clutch hub 15c, a second gear 20c formed on an intermediate shaft 20b, and a third gear 20d formed on a front wheel drive shaft 21. The front wheel drive shaft 21 is connected to the front wheels 1. When the transfer clutch 15 is engaged, the driving torque is transmitted to the front wheels 1 through the gear train 20.

The hydraulic circuit 40 includes an oil pump 16, a discharge pipe 17, a suction pipe 18, an electromagnetic proportional control relief valve 47 actuated by a valve solenoid 46, a drain pipe 48, and an oil tank 19. The oil pump 16 sucks an oil from the oil tank 19 through the suction pipe 18, and supplies the pressurized oil to the cylinder chamber 15f of the transfer clutch 15 through the discharge pipe 17. When the pressurized oil is supplied to the cylinder chamber 15f, the clutch piston 15e compresses the friction plates 15b and the friction discs 15d by the action of a clutch engagement pressure P applied on the piston 15e, so that the driving power inputted to the input shaft 13 is transmitted toward the front wheels 1.

Figure 3:
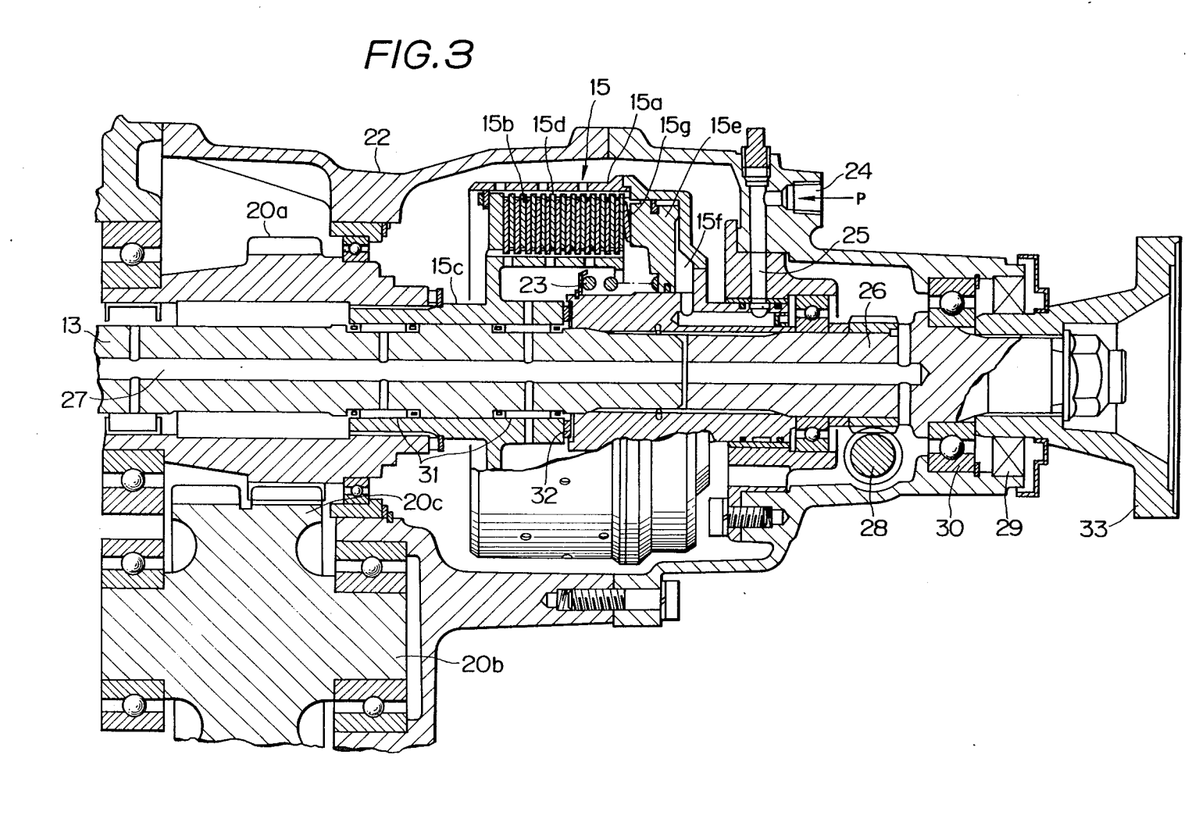
FIG. 3 is a sectional view of a transfer used in all the illustrated embodiments of the present invention.

FIG. 3 shows the transfer 10 in detail. The transfer clutch 15, gearing and shafting are enclosed in a transfer case 22. There are further provided a dish plate 15g, a return spring 23, a rear wheel output shaft 26 a pressurized oil inlet port 24, a pressurized oil passage 25, a lubricating oil passage 27, a pinion 28 for a speedometer, an oil seal 29, a bearing 30, needle bearings 31, a thrust bearing 32, and a flange coupling 33.

Figure 4:
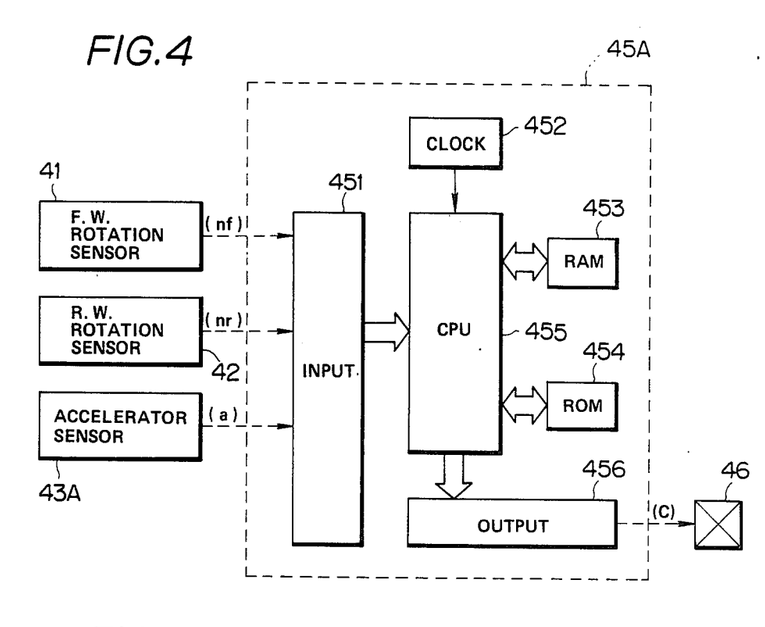
FIG. 4 is a block diagram showing a control system of the first embodiment shown in FIG. 2.

In the first embodiment, the sensor group 5 includes a front wheel rotation sensor 41, a rear wheel rotation sensor 42 and an accelerator position sensor 43A, as shown in FIGS. 2 and 4. The front wheel and rear wheel rotation sensors 41 and 42 are provided in the front wheel drive shaft 21 and the rear wheel drive shaft 14, respectively. For example, each of the rotation sensors 41 and 42 is of a photoelectric type having a photoelectric tube and a photoelectric element disposed near a rotary disc fixed to the shaft. Each of the front wheel and rear wheel rotation sensors 41 and 42 produces a rotation signal (nf) or (nr) representing a rotational speed of the shaft.

The accelerator position sensor 43A of the first embodiment senses the depression degree of an accelerator pedal, and produces an accelerator position signal (a) representing the depression degree. The accelerator position sensor 43 serves as a means for sensing an accelerating condition of the vehicle.

A control unit 45A is connected with the sensors 41, 42 and 43A. The control unit 45A receives the rotation signals (nf) and (nr) from the sensors 41 and 42, and the accelerator position signal (a) from the sensor 43A. In each control cycle, the control unit 45A selects one among a plurality of predetermined control characteristics (or relationships) having different factors of proportionality (control constants) in dependence on a current value of the accelerator position A represented by the accelerator position signal (a), and produces a control signal (c) whose value is determined from a front wheel and rear wheel speed difference ΔN by using the selected control characteristic. The control unit 45A delivers the thus-produced control signal (c) to the valve solenoid 46. As shown in FIG. 4, the control unit 45A has an input circuit 451, a clock circuit 452, a RAM 453, a ROM 454, a CPU 455 and an output circuit 456.

The control characteristics are relationships between a torque ΔT transmitted to the front wheels, and a speed difference ΔN ($\Delta N = N_r - N_f$) between a front wheel speed $N_f$ and a rear wheel speed $N_r$, expressed by the following equation:

$$\Delta T = K \cdot \text{func}(\Delta N)$$

where K is a factor of proportionality, and func(ΔN) is a variable quantity which is a function of the speed difference ΔN. A plurality of the control characteristics are set by setting the factor K equal to different constant values. Each of the control characteristics is determined by a unique value of the factor K.

The input circuit 451 reders the input signals sent from the sensors 41, 42 and 43A into a signal form appropriate to the CPU 455. The clock circuit 452 measures and indicates time. By the aid of the clock circuit 452, the CPU 452 performs a control program each time a predetermined time interval has elapsed. The RAM (random access memory) 453 temporarily stores input data and other information necessary for the operation. The ROM (read-only memory) 454 stores control characteristics $C_1$, $C_2$ and $C_3$ of different proportionality constants ($K_1$, $K_2$ and $K_3$) shown in FIG. 5 in the form of a table or tables.

Figure 5:
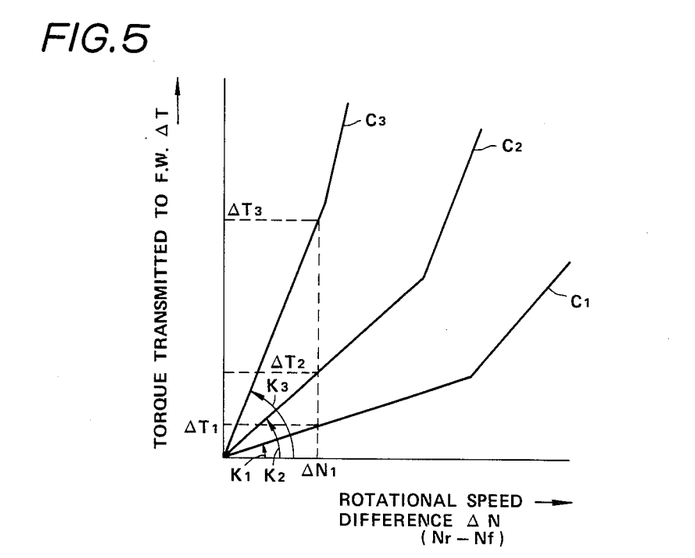
FIG. 5 is a graph showing control characteristics stored in a control unit of the first embodiment.

Each of the control characteristics defines a relationship between the torque ΔT transmitted to the front wheels and the speed difference ΔN. The CPU 455 selects one of the control characteristics in accordance with the accelerator position A, and performs a table look-up to determine the torque ΔT by using the selected control characteristic and the current value of the speed difference ΔN.

As shown in FIG. 5, in each control characteristic of this embodiment, the torque ΔT is increased with increase in the speed difference ΔN along a first straight line segment so that a proportionality exists until the speed difference ΔN reaches a certain value, and the torque ΔT is further increased along a second straight line segment lying end to end with the first line segment and having a slope which is greater than the slope of the first line segment, in the range of the speed difference ΔN above the certain value. In this way, the rate of increase of the torque ΔT with respect to increase in the speed difference is abruptly increased when the speed difference ΔN exceeds the certain value, in order to prevent the slip of the clutch.

The CPU (central processing unit) 455 is designed to calculate the speed difference ΔN, and determine the torque ΔT by using data stored in the RAM 453 and the ROM 454. The output circuit 456 is designed to output the control signal (c) corresponding to the torque ΔT determined by the CPU 455, to the valve solenoid 46.

The valve solenoid 46 is an actuator for actuating the electromagnetic proportional control relief valve 47 disposed in the drain pipe 48 leading from the discharge pipe 17 to the oil tank 19. The valve solenoid 46 makes the clutch engagement pressure P equal to the value corresponding to the control signal (c) by opening and closing the relief valve 47. The clutch engagement pressure P is given by:

$$P = \Delta T / (\mu \cdot S \cdot 2n \cdot R_m)$$

where μ is a coefficient of friction of the friction plates and discs, S is an area of the piston receiving the pressure, n is the number of the friction discs, and $R_m$ is a radius effective for torque transmission, of the friction discs. Therefore, the torque ΔT increases in proportion to the clutch engagement pressure P.

Figure 6:
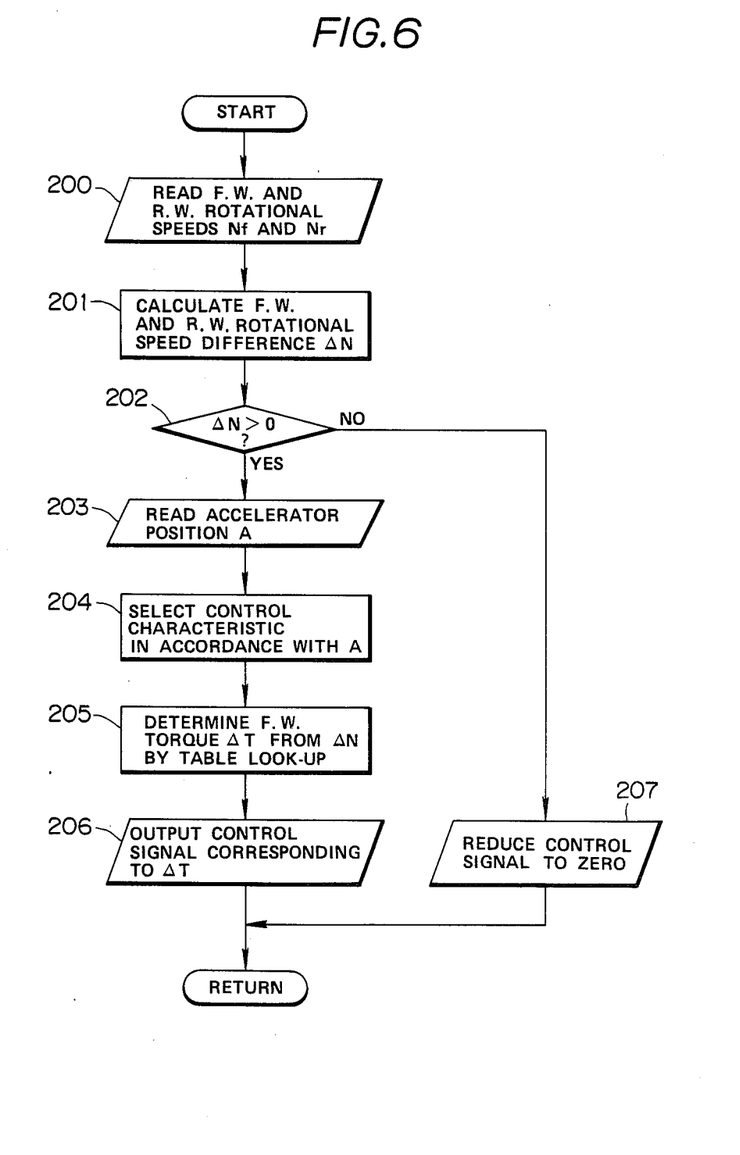
FIG. 6 is a flowchart showing operations performed in the control unit of the first embodiment.

The control system of the first embodiment is operated as shown in FIG. 6.

(A) When the front wheel and rear wheel speed difference ΔN is positive:

When the speed difference ΔN is greater than zero, that is, when the rear wheels are slipping, a succession of steps 200, 201, 202, 203, 204, 205 and 206 is repeated. The control system reads the front wheel and rear wheel rotational speeds $N_f$ nd $N_r$ at the step 200, calculates the front wheel and rear wheel speed difference ΔN ($\Delta N = N_r - N_f$) at the step 201, determines whether the speed difference ΔN is positive or not at the step 202, reads the accelerator position A at the step 203, selects one of the control characteristics $C_1$, $C_2$ and $C_3$ in accordance with accelerator position A at the step 204, retrieves the value of the torque ΔT corresponding to the speed difference ΔN in accordance with the selected control characteristic by performing a table look-up at the step 205, and outputs the control signal (c) to provide the determined value of the torque ΔT at the step 206.

When the accelerator pedal is depressed to accelerate the vehicle sharply, and the front wheel and rear wheel speed difference ΔN is equal to $\Delta N_1$, for example, the selection is changed from the characteristic $C_1$ to the characteristic $C_2$ and then from the characteristic $C_2$ to the characteristic $C_3$ as the acclerator position approaches the fully depressed position, that is, as the throttle valve opening degree increases. In the early stage of the depression of the accelerator pedal, the control characteristic $C_1$ is selected, and the control signal corresponding to the torque $\Delta T_1$ is outputted. When the accelerator pedal is depressed to a medium degree, the control characteristic $C_2$ is selected, and the control signal corresponding to the torque $\Delta T_2$ is outputted. When the accelerator pedal is depressed deeply, the control characteristic $C_3$ is selected, and the control signal corresponding to the torque $\Delta T_3$ is outputted. If the accelerator pedal is depressed abruptly, then the torque $\Delta T$ transmitted to the front wheels is increased from $\Delta T_1$, through $\Delta T_2$, to $\Delta T_3$ within a very short time interval. Therefore, the vehicle is accelerated in the drive mode close to the four wheel drive mode.

In this mode, the control system of the first embodiment prevents wheel slip when the vehicle is started rapidly, and prevents spin when the vehicle is turned with fast acceleration.

When the accelerator pedal is depressed only slightly to accelerate the vehicle slowly while the speed difference $\Delta N$ is equal to $\Delta N_1$, the accelerator position A is hardly changed, and the throttle valve opening degree corresponding to the accelerator position A is maintained small. Therefore, the torque $\Delta T$ transmitted to the front wheel is held equal to the small value $\Delta T_1$ by selecting only the control characteristic $C_1$, so that the vehicle is accelerated in the drive mode close to the rear wheel drive mode. In this way, the control system of the first embodiment reduces the understeer tendency when the vehicle is turned with slow acceleration.

(B) When the front wheel and rear wheel speed difference $\Delta N$ is equal to zero or negative:

When the front wheel and rear wheel speed difference $\Delta N$ is equal to or smaller than zero (, for example, during a straight motion of the vehicle on a dry road surface without slippage of the tires), the control system follows the succession of steps 200, 201, 202 and 207. At the step 207, the value of the control signal (c) is reduced to zero. Therefore, the control system outputs the control signal whose value is held equal to zero to maintain the rear wheel drive mode.

As mentioned before, the control system of the first embodiment can prevent wheel slip during rapid start of the vehicle and spin during a turn of the vehicle with fast acceleration, and reduce the understeer tendency during a turn with slow acceleration. Thus, the control system controls the driving force distribution properly in accordance with the accelerating condition of the vehicle while preventing abrupt change of the steer characteristics of the vehicle by varying the driving force distribution smoothly in accordance with the front wheel and rear wheel speed difference.

In the first embodiment, for front wheel drive vehicle based on a rear wheel drive vehicle is employed. However, it is optional to employ a four wheel drive vehicle based on a front wheel drive vehicle. In this case, the speed difference $\Delta N$ should be set equal to $N_f - N_r$, instead of $N_r - N_f$.

It is optional to employ control characteristics between the speed difference $\Delta N$ and the torque $\Delta T$ different form the characteristics shown in FIG. 5. For example, it is possible to employ characteristics of a viscous clutch.

The condition sensor 43 of the first embodiment takes the form of the accelerator position sensor 43A. However, it is optional to use, as the condition sensor 43, a negative pressure sensor disposed in an air intake passage of the engine, or a sensor for sensing the position of a throttle valve, or a sensor for sensing movement of the accelerator pedal. At the step 205 of the flowchart of FIG. 6, the procedure of table look-up is employed for determining the torque $\Delta T$ from the speed difference $\Delta N$. However, the control system may be arranged to store the control characteristics in the form of a mathematical expression such as an equation, and to determine the toque $\Delta T$ by substituting values of the proportionally constant and the front wheel and rear wheel speed difference $\Delta N$ into the mathematical expression. The number of the proportionally constants does not necessarily have to be three. It is optional to use the values of the accelerator position A as the values of the proportionality constants, or to determine a value of the proportionality constants from each value of the accelerator position A by performing a predetermined mathematical operation.

It is optional to use, in place of the accelerator position A, a derivative $\dot{A}$ of the accelerator position (or displacement) A with respect to time, or a linear combination $(\alpha A + \beta \dot{A})$ of the accelerator position A and the derivative $\dot{A}$ of the accelerator position A. In the case of the derivative $\dot{A}$ of the accelerator position, it is possible to take account of the time rate of change of position of the accelerator. In the case of the linear combination $(\alpha A + \beta \dot{a})$, it is possible to know the accelerating condition of the vehicle accurately by setting values of constants $\alpha$ and $\beta$ appropriately.

Figure 7:
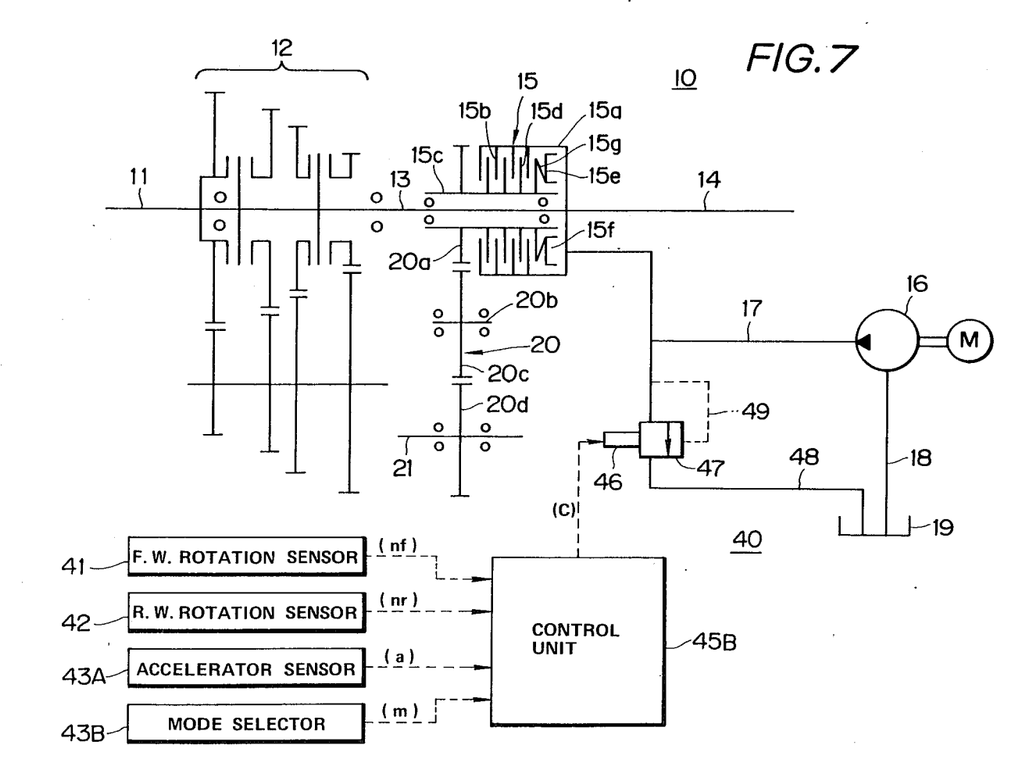
FIG. 7 is a schematic view similar to FIG. 2, but showing a second embodiment of the present invention.
Figure 8:
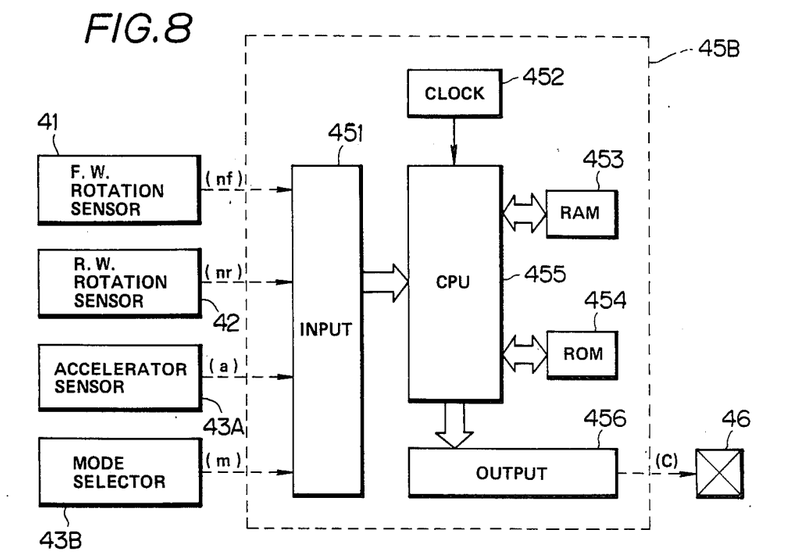
FIG. 8 is a block diagram showing a control system of the second embodiment.

A SECOND EMBODIMENT of the present invention is shown in FIGS. 7-10. A four wheel drive vehicle of the second embodiment is constructed on the basis of a rear wheel drive vehicle, as in the first embodiment. A four wheel drive system of the second embodiment shown in FIGS. 7 and 8 is different from the four wheel drive system of the first embodiment shown in FIG. 2 only in the addition of a mode accelerator 43B and the functions of a control unit 45B.

In the second embodiment, the sensor group 5 includes the front wheel rotation sensor 41 for sensing the front wheel rotational speed $N_f$, the rear wheel rotation sensor 42 for sensing the rear wheel rotation speed $N_r$, the accelerator position sensor 43A for sensing the accelerator position A, and the mode selector 43B. That is, the third element 43 of the second embodiment consists of the accelerator position sensor 43A and the mode selector 43B.

Figure 9:
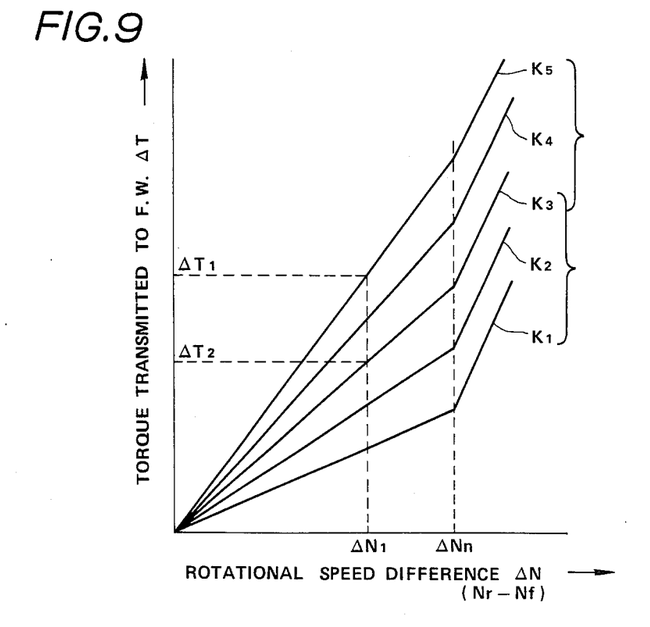
FIG. 9 is a graph showing control characteristics stored in a control unit of the second embodiment.

FIG. 9 shows control characteristics stored in the control unit 45B, as an example. The control charcteristics are groupted so that characteristics $K_1$, $K_2$ and $K_3$ are included in a sports mode group, and characteristics $K_3$, $K_4$ and $K_5$ are included in a normal mode group. The normal mode group has a tendency toward the four wheel drive, and the sports mode group has a tendency toward the two wheel drive. The mode selector 43B is a means for selecting either of the normal mode group and the sports mode group. The mode selector may take the form of a manual selector switch operated by a driver of the vehicle, or may taken the form of a sensor for judging the driving condition of the vehicle or the road surface condition and selecting one of the mode groups automatically. The control unit 45B is arranged to select one control characteristic in accordance with the accelerator position A out of the mode group selected by the mode selector 43A, and to produce the control signal (c) according to the selected control characteristic.

In each of the control characteristics, the torque $\Delta T$ transmitted to the front wheels is increasesd in proportion to the speed difference $\Delta N$ until a predetermined speed difference value $\Delta N_n$ is reached. As shown in FIG. 9, in the range of the speed difference $\Delta N$ below $\Delta N_n$, the slope of each characteristic is constant and a proportionality exists. In the range of the speed difference $\Delta N$ below $\Delta N_n$, the slope of the characteristic $K_i$ is greater than the slope of the characteristic $K_{i-1}$ where i is any whole number from 2 to 5. When the speed difference $\Delta N$ exceeds $\Delta N_n$, the torque $\Delta T$ transmitted to the front wheels is increased abruptly to prevent slip of the transfer clutch 15. In each characteristic, the slope in the range of the speed difference $\Delta N$ above $\Delta N_n$ is steeper than the slope in the range below $\Delta N_n$. That is, the rate of increase of the torque $\Delta T$ with respect to the speed difference is made higher when the speed difference $\Delta N$ becomes higher than $\Delta N_n$. In the normal mode group of the characteristics $K_3$, $K_4$ and $K_5$, the torque $\Delta T$ transmitted to the front wheels is relatively high so that there is the tendency toward the four wheel drive. In the sports mode group of the characteristics $K_1$, $K_2$ and $K_3$, the torque $\Delta T$ transmitted to the front wheels is relatively low so that there is the tendency toward the rear wheel drive.

Figure 10:
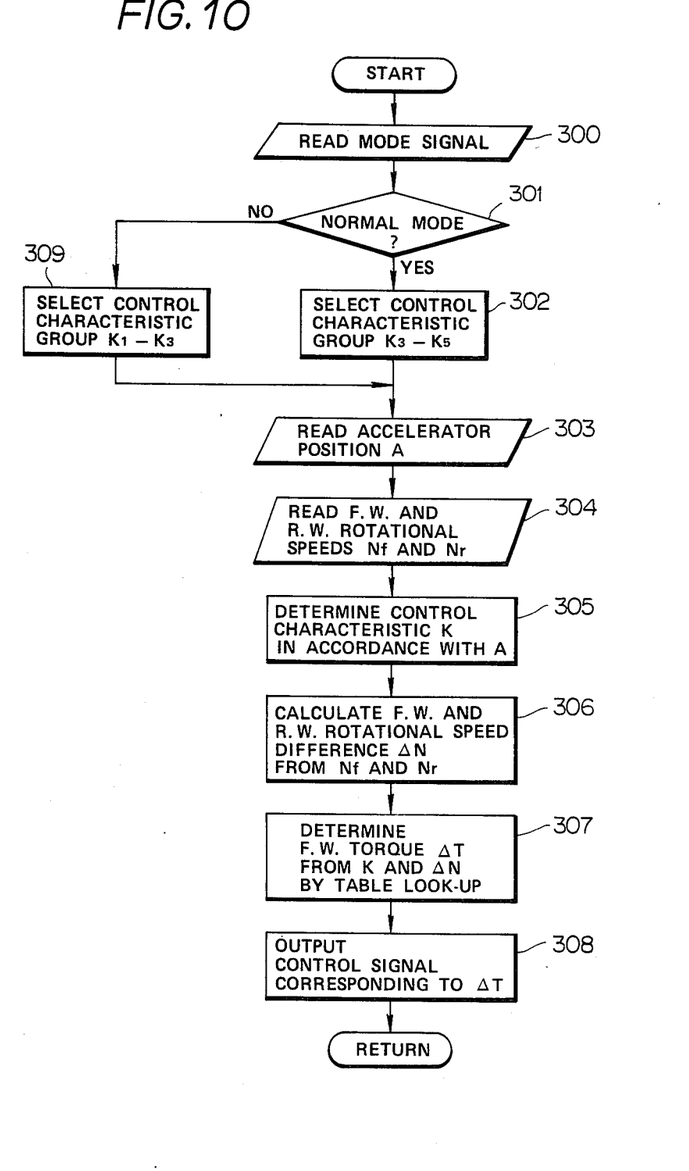
FIG. 10 is a flowchart showing operations performed in the control unit of the second embodiment.

The control system of the second embodiment is operated as shown in FIG. 10.

(A) When the normal mode is selected: When the normal mode is selected through the mode selector 43B, the control system follows a succession of steps 300, 301, 302, 303, 304, 305, 306, 307 and 308.

At the step 300, the control system reads a mode selection signal (m) delivered from the mode selector 43B. At the step 301, the control system determines from the mode selection signal (m) whether the normal mode is selected or not. At the step 302, the control system selects the normal mode group of the characteristics $K_3$-$K_5$. Then, the control system reads the accelerator position A at the step 303, reads the front wheel and rear wheel speeds $N_f$ and $N_r$ at the step 304, and selects one of the control characteristics included in the normal mode group in accordance with the accelerator position A at the step 305. As the depression degree of the accelerator pedal and the throttle valve opening degree increase, the characteristic selected at the step 305 is changed from $K_3$ to $K_4$, and from $K_4$ to $K_5$. The characteristic $K_5$ is selected when the accelerator pedal is depressed deeply, and the throttle valve opening degree is large. At the step 306, the front wheel and rear wheel rotational speed difference $\Delta N$ is calculated from $N_f$ and $N_r$. At the step 307, the control system determines the torque $\Delta T$ transmitted to the front wheels through a table look-up by using the speed difference calculated at the step 306 and the control characteristic K selected at the step 305. At the step 308, the control signal (c) corresponding to the torque $\Delta T$ determined at the step 307 is delivered to the solenoid 46.

If, for example, the speed difference $\Delta N$ equals $\Delta N_1$, and the throttle valve opening degree corresponding to the accelerator position is great, then the characteristic $K_5$ is selected from the normal mode group in response to the accelerator position, and the torque $\Delta T_1$ is obtained in correspondence with the speed difference $\Delta N_1$, as shown in FIG. 9.

(B) When the sports mode is selected:

When the sports mode is selected, the control system proceeds from the step 300 through the steps 301, 309, 303, 304, 305, 306 and 307 to the step 308.

The control system selects the sports mode group of the characteristics $K_1$-$K_3$ at the step 309, and further selects one out of the sports mode group at the step 305. The characteristic selected at the step 305 is changed from $K_1$ to $K_2$, and from $K_2$ to $K_3$ as the depression degree of the accelerator pedal and the throttle valve opening degree are increased.

If the condition is the same as in the case of the normal mode, that is, the speed difference equals $\Delta N_1$, and at the same time the throttle value opening degree corresponding to the accelerator position is great, then the control system selects the characterstic $K_3$, and obtains the torque $\Delta T_2$ which is smaller than $\Delta T_1$.

In this way, the control system of the second embodiment increases the tendency toward the four wheel drive by increasing the torque transmitted to the front wheels when the normal mode is selected. Therefore, the vehicle is provided with an understeer characteristic having a tendency toward drift-out, so that the stable cornering performance which has little tendency to spin and which is suitable for normal driving can be obtained. When the sports mode is selected, the control system of the second embodiment increases the tendency to the rear wheel drive by decreasing the torque transmitted to the front wheels, so that the cornering performance which enables power drift during a turn and which is suitable for rally and sports driving can be obtained. Besides, the control system of the second embodiment, as well as the control system of the first embodiment, prevents an abrupt change in the steer characteristic during a turn because the control system varies the driving force distribution gradually with change in the speed difference $\Delta N$.

Figure 11:
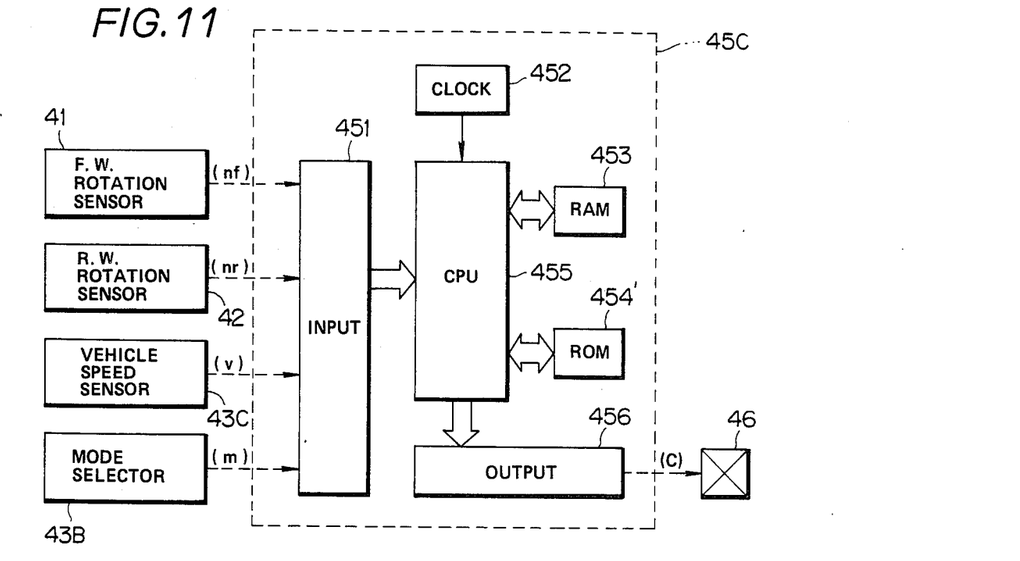
FIG. 11 is a block diagram showing a control system of a third embodiment.
Figure 12:
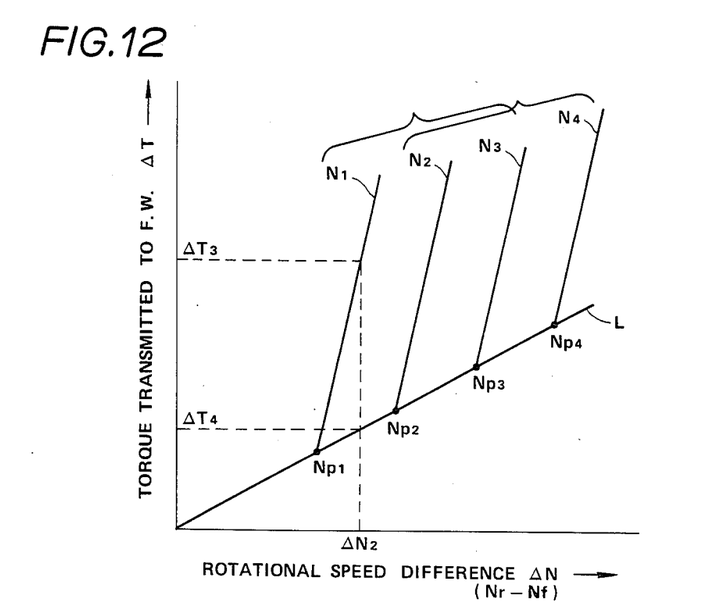
FIG. 12 is a graph showing control characteristics stored in a control unit of the third embodiment.
Figure 13:
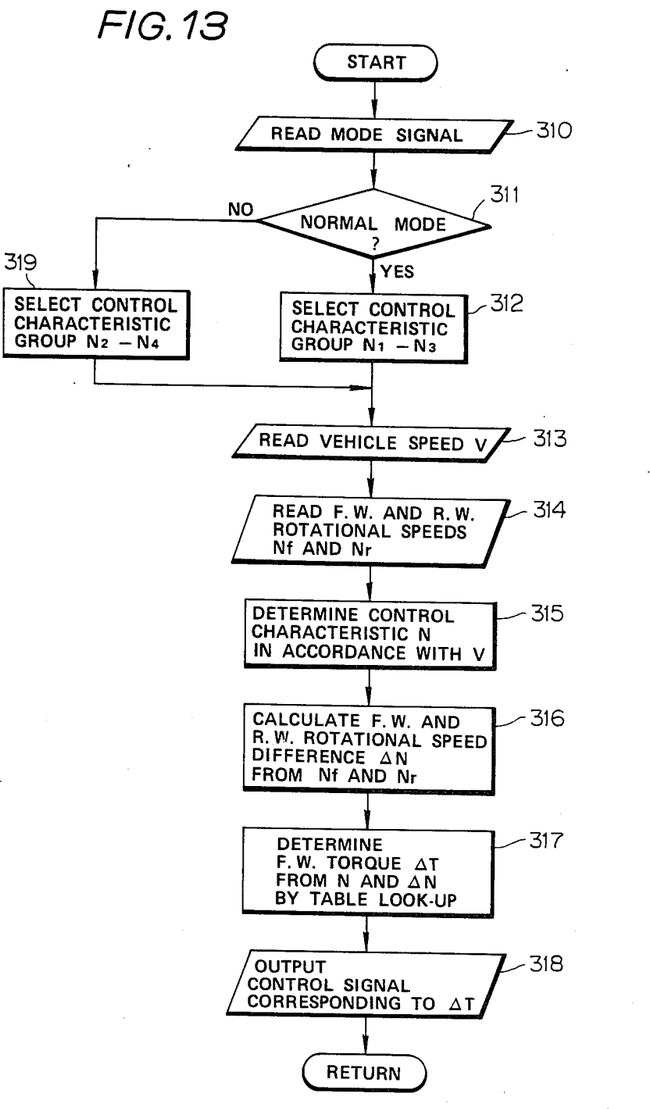
FIG. 13 is a flowchart showing operations performed in the control unit of the third embodiment.

A THIRD EMBODIMENT of the present invention is shown in FIGS. 11-13. The third embodiment is different from the second embodiment only in that a vehicle speed sensor 43C is substituted for the accelerator sensor 43A, as shown in FIG. 11, and in that control characteristics $N_1$-$N_4$ are substituted for the characteristics $K_1$-$K_5$, as shown in FIG. 12.

As shown in FIG. 12, each of the control characteristic lines $N_1$-$N_4$ has a first straight line segment lying on a straight line L common to all the characteristic lines $N_1$-$N_4$, a unique branch point $N_{p1}$, $N_{p2}$, $N_{p3}$ or $N_{p4}$ and a unique second straight line segment extending from the branch point. Each branch point $N_{p1}$, $N_{p2}$, $N_{p3}$ or $N_{p4}$, is a unique speed difference reference value for each control characteristic. In each of the control characteristic line, the torque $\Delta T$ is increased in proportion to the speed difference $\Delta N$ along the common straight line L common to all the characteristic lines until the branch point of that characteristic line is reached.

$\Delta T$ being linearly proportional to $\Delta N$ for $\Delta N$ values less than a reference value, the slope of L is the coefficient by which is multiplied to obtain $\Delta T$ for $\Delta N$ values less than the reference value. When the speed difference $\Delta N$ is further increased beyond the reference value or branch point, the torque $\Delta T$ is increased along the second straight line segment. $\Delta T$ being linearly proportional to $\Delta N$ for $\Delta N$ values greater than the reference value, the slope of the second line segment is the coefficient by which the difference between $\Delta N$ and the reference value is multiplied to obtain that portion of $\Delta T$ attributable to the $\Delta N$ value in excess of the reference value. The slope of the second straight line segment (second coefficient) of each characteristic line is steeper than the slope of the common straight line L (first coefficient). The control characteristic lines $N_1$-$N_4$ are classified into a sports mode group which includes the characteristics $N_2$, $N_3$ and $N_4$, and a normal mode group which includes the characteristics $N_1$, $N_2$ and $N_3$. In this embodiment, the branch point of each characteristic included only in the sports mode group is located rightwardly of the branch points of the normal mode group in FIG. 12. That is, the speed difference value at each branch point included only in the sports mode is higher than the speed difference value at any of the branch points included in the normal mode. Similarly, the branch point included only in the normal mode is located leftwardly of the branch points of the sports mode group in FIG. 12.

The control system of the third embodiment is operated as shown in FIG. 13.

(A) When the normal mode is selected:

When the normal mode is selected by the mode selector 43B, the control system proceeds from a step 310 of FIG. 13 through steps 311, 312, 313, 314, 315, 316 and 317 to a step 318.

The control system of the third embodiment selects the normal mode group $N_1$–$N_3$ at the step 312 in response to the affirmative answer of the the step 311 corresponding to the step 301 of FIG. 10. At the step 315, the control system selects one control characteristic N out of the normal mode group $N_1$–$N_3$ in accordance with the vehicle speed V which is sensed by the vehicle speed sensor 43C and read at the step 313. The characteristic selected at the step 315 is changed from $N_1$ to $N_2$ and from $N_2$ to $N_3$ as the vehicle speed V increases.

If, for example, the speed difference $\Delta N$ equals $\Delta N_2$, and the vehicle speed V is low, then the control system selects the characteristic $N_1$ in response to the vehicle speed being low, and then outputs the control signal (c) corresponding to a magnitude $\Delta T_3$ of the torque $\Delta T$ shown in FIG. 12 in response to the speed difference $\Delta N$ being equal to $\Delta N_2$.

(B) When the sports mode is selected:

When the sports mode is selected by the mode selector 43B, the control system proceeds from the step 310 to the step 318 by way of a step 319.

The control system selects the sports mode group $N_2$–$N_4$ at the step 319, and selects one characteristic out of the sports mode group in accordance with the vehicle speed V at the step 315. The characteristic selected at the step 315 is changed from $N_2$ to $N_3$, and then from $N_3$ to $N_4$ as the vehicle speed V increases. That is, $N_2$ is selected when V is relatively low, $N_3$ is selected when V is medium, and $N_4$ is selected when V is relatively high.

If the condition is the same as in the case of the normal mode (that is, $\Delta N$ equals $\Delta N_2$ and V is low), then the control system selects $N_2$, and outputs the control signal (c) corresponding to a value $\Delta T_4$ of the torque which is smaller than $\Delta T_3$ as shown in FIG. 12.

In the same manner as in the second embodiment, the control system of the third embodiment increases the tendency to the four wheel drive by increasing the torque transmitted to the front wheels when the normal mode is selected, and increases the tendency to the rear wheel drive by decreasing the torque transmitted to the front wheels when the sports mode is selected. Therefore, the control system of the third embodiment, too, can satisfy different demands by providing different cornering performances in accordance with the mode selection.

In the second and third embodiments, the modes of two different kinds are employed. However, it is optional to employ three or more different modes. The second and third embodiments employ the accelerator sensor 43A and the vehicle speed sensor 43C, respectively, in addition to the mode selector 43B. That is, the third element 43 of the sensor group 5 shown in FIG. 1 includes the mode selector 43B, and the vehicle condition sensor which takes the form of the accelerator sensor 43A in the second embodiment, or the vehicle speed sensor 43C in the third embodiment. However, the third element may be designed in various manners.

For example, the third element 43 may includes both of the accelerator sensor 43B and the vehicle speed sensor 43C in addition to the mode selector 43B. A sensor for sensing a driving torque of the engine and/or a sensor for sensing a road surface may be employed as the condition sensor, singularly or in combination with one or more other condition sensors. Furthermore it is optional to omit the vehicle condition sensor. In this case, the third element 43 consists of the mode selector 43B only.

Each mode group of the second and third embodiments includes a plurality of the control characteristics. However, each mode group may include only one characteristic.

What is claimed is:

1. A four wheel drive system for a vehicle having at least an engine, a primary driving wheel pair and a secondary driving wheel pair, comprising;
   a transfer mechanism for transmitting torque from said engine to said primary driving wheel pair, and transmitting torque from said engine to said secondary driving wheel pair through a transfer clutch capable of gradually varying a clutch engagement force,
   actuating means for gradually varying said clutch engagement force of said transfer clutch in response to a control signal,
   first means for sensing a primary wheel rotational speed of said primary wheel pair,
   second means for sensing a secondary wheel rotational speed of said secondary wheel pair,
   third means for producing a third signal indicative of a position of a movable control element controllable by a driver of said vehicle, and
   control means for producing said control signal to gradually vary said clutch engagement force of said transfer clutch, said control means gradually increasing said clutch engagement force through said actuating means with increase in a speed difference obtained by subtracting said secondary wheel speed sensed by said secondary wheel speed sensing means from said primary wheel speed sensed by said primary wheel speed sensing means, the engagement force further varies in accordance with one of a set of predetermined relationships selected in accordance with said third signal, each of said relationships constituting a separate characteristic function of a desired torque to be transmitted to said secondary wheel pair through said transfer clutch, said control means varying a rate of increase of said clutch engagement force of said transfer clutch with respect to said speed difference in accordance with the relationship selected corresponding to said third signal based on a comparison between the speed difference and a predetermined speed difference reference value.

2. A four wheel drive system according to claim 1 wherein said third means senses an accelerating condition of said vehicle, and said control means increases said clutch engagement force with increase in said speed difference at a rate of increase which is set equal to a higher value when said accelerating condition sensed by said third means indicates a rapid acceleration of said vehicle, and equal to a lower value lower than said higher value when said accelerating condition indicates a gradual acceleration of said vehicle.

3. A four wheel drive system according to claim 2 wherein said third means senses a position of a predetermined point of an accelerator system of said vehicle for varying a speed of said vehicle by varying a supply of fuel to said engine.

4. A four wheel drive system according to claim 3 wherein said third means comprises an accelerator sensor for sensing an opening degree of a throttle valve of said engine.

5. A four wheel drive system according to claim 4 wherein said control means stores a set of said predetermined relationships relating a desired torque to be transmitted to said secondary wheel pair through said transfer clutch with said speed difference, each of said relationships of said set being so determined that said desired torque increases as said speed difference increases from zero, any two of said relationships of said set consisting of lower and higher ones so determined that said desired torque of said higher one is always equal to or greater than said desired torque of said lower one for any given value of said speed difference above zero, said control means selecting one of said relationships of said set in accordance with said opening degree sensed by said third means in such a manner that, in any two of said relationships of said set, said opening degree at which said higher one is selected is greater than said opening degree at which said lower one is selected.

6. A four wheel drive system according to claim 5 wherein, in each of said relationships, said desired torque is equal to a product obtained by multiplying said speed difference by a first coefficient when said speed difference is smaller than said reference value, and equal to a sum of a first product obtained by multiplying a difference between said speed difference and said reference value by a second coefficient which is greater than said first coefficient, and a second product obtained by multiplying said reference value by said first coefficient when said speed difference is greater than said reference value.

7. A four wheel drive system according to claim 6 wherein said control means reduces said control signal to zero to transmit torque from said engine only to said primary wheel pair when said speed difference is non-positive.

8. A four wheel drive system according to claim 7 wherein said accelerator sensor senses a position of an accelerator pedal to determine said opening degree.

9. A four wheel drive system according to claim 8 wherein, in any two of said relationships of said set, said first coefficient of said higher one is greater than said first coefficient of said lower one, said second coefficient of said higher one is greater than said second coefficient of said lower one, and said reference value of said higher one is lower than said reference value of said lower one.

10. A four wheel drive system according to claim 9 wherein said primary wheel pair is a rear wheel pair and said secondary wheel pair is a front wheel pair.

11. A four wheel drive system according to claim 5 wherein said third means further comprises mode selecting means for selecting one of first and second drive modes, and wherein said control means selects one of said relationships out of a first subset of said set when said first drive mode is selected, and out of a second subset of said set when said second drive mode is selected, said first subset having a stronger tendency toward a four wheel drive than said second subset, and said second subset having a stronger tendency toward a two wheel drive than said first subset.

12. A four wheel drive system according to claim 11 wherein, in each of said relationships, said desired torque is equal to a product obtained by multiplying said speed difference by a first coefficient when said speed difference is smaller than a reference value, and equal to a sum of a first product obtained by multiplying a difference between said speed difference and said reference value by a second coefficient which is greater than said first coefficient, and a second product obtained by multiplying said reference value by said first coefficient when said speed difference is greater than said reference value.

13. A four wheel drive system according to claim 12 wherein said reference values of all of said relationships of said set are equal to one another, and said second coefficients of all of said relationships of said set are equal to one another, and wherein, in any two of said relationships of said set, said first coefficient of said higher one is greater than said first coefficient of said lower one.

14. A four wheel drive system according to claim 13 wherein said mode selecting means comprises a manually operated selector switch.

15. A four wheel drive system according to claim 1 wherein said third means comprises mode selecting means for selecting one of first and second drive modes, and said control means stores a set of said predetermined relationships between a desired torque to be transmitted to said secondary wheel pair through said transfer clutch and said speed difference, and selects one of said relationships out of a first subset of said set when said first drive mode is selected, and out of a second subset of said set when said second drive mode is selected.

16. A four wheel drive system according to claim 15 wherein said mode selecting means comprises a manually operated selector switch.

17. A four wheel drive system according to claim 16 wherein said third means further comprises condition sensing means for sensing a vehicle velocity dependent condition of said vehicle, and wherein at least one of said first and second subsets includes a plurality of said relationships one of which is selected in accordance with said condition of said vehicle.

18. A four wheel drive system according to claim 1, wherein each of said relationships is so determined that said desired torque increases more gradually when said speed difference is lower than said predetermined speed difference reference value than when said speed difference is higher than said reference value.

19. A four wheel drive system according to claim 1 wherein, in each of said relationships, said desired torque is equal to a product obtained by multiplying said speed difference by a first coefficient when said speed difference is lower than said reference value, and equal to a sum of a first product obtained by multiplying a difference between said speed difference and said reference value by a second coefficient which is greater than said first coefficient and a second product obtained by multiplying said reference value by said first coefficient when said speed difference is greater than said reference value.

20. A four wheel drive system according to claim 1 wherein said third means comprises condition sensing means for sensing an accelerator position of said vehicle.

21. A four wheel drive system according to claim 1 wherein said control means reduces said clutch engagement force to zero when said speed difference is nonpositive, and gradually increases said clutch engagement force from zero as said speed difference increases from zero.

22. A four wheel drive system for a vehicle having at least an engine, a primary driving wheel pair and a secondary driving wheel pair, comprising:
- a transfer mechanism for transmitting torque from said engine to said primary driving wheel pair, and transmitting torque from said engine to said secondary driving wheel pair through a transfer clutch capable of varying torque transmitted therethrough by varying a clutch engagement force;
- actuating means for varying said clutch engagement force of said transfer clutch in response to a control signal;
- first means for sensing a primary wheel rotational speed of said primary wheel pair;
- second means for sensing a secondary wheel rotational speed of said secondary wheel pair;
- third means for producing a third signal indicative of a position of a movable control element controllable by a driver of said vehicle, said third means comprises a manually operated selector switch for selecting one of first and second drive modes; and
- control means for producing said control signal to vary said clutch engagement force of said transfer clutch, said control means increasing said clutch engagement force with increase in a speed difference obtained by subtracting said secondary wheel speed sensed by said secondary wheel speed sensing means from said primary wheel speed sensed by said primary wheel speed sensing means in accordance with one of a set of predetermined relationships selected in accordance with said third signal;
- wherein said control means stores a set of said predetermined relationships between a desired torque to be transmitted to said secondary wheel pair through said transfer clutch and said speed difference, and selects one of said relationships out of a first subset of said set when said first drive mode is selected, and out of a second subset of said set when said second drive mode is selected; and
- wherein said third means further comprises condition sensing means for sensing a vehicle speed, and wherein at least one of said first and said second subsets includes a plurality of said relationships, one of which is selected in accordance with said condition of said vehicle.

23. A four wheel drive system according to claim 22, wherein:
- each of said relationships of said set being so determined that said desired torque increases as said speed difference increases from zero; and
- any two of said relationships of said set consisting of lower and higher ones so determined that said desired torque of said higher one is always equal to or greater than said desired torque of said lower one for any given value of said speed difference above zero, said control means selecting one of said relationships in accordance with said vehicle speed in such a manner that, in any two of said relationships of one of said first and second subsets, said vehicle speed at which said higher one is selected is lower than said vehicle speed at which said lower one is selected.

24. A four wheel drive system according to claim 23, wherein:
for each of said relationships of said set, said desired torque is equal to:
(a) a product obtained by multiplying said speed difference by a first coefficient when said speed difference is smaller than a reference value; and
(b) the sum of
  (1) a first product obtained by multiplying said reference value by a first coefficient; and
  (2) a second product obtained by multiplying the difference between said speed difference and said reference value by a second coefficient, said second coefficient being greater than said first coefficient, when said speed difference is greater than said reference value; and
wherein, in any two of said relationships of said set, said reference value of said higher one is smaller than said reference value of said lower one, said first coefficients of all of said relationships of said set are equal to one another, and said second coefficients of all of said relationships of said set are equal to one another.

* * * * *